Dec. 29, 1931.  F. A. BRINKER  1,838,359
PRODUCING FUMED ZINC OXIDE FROM ZINC SULPHATE SOLUTION
Filed Oct. 21, 1926
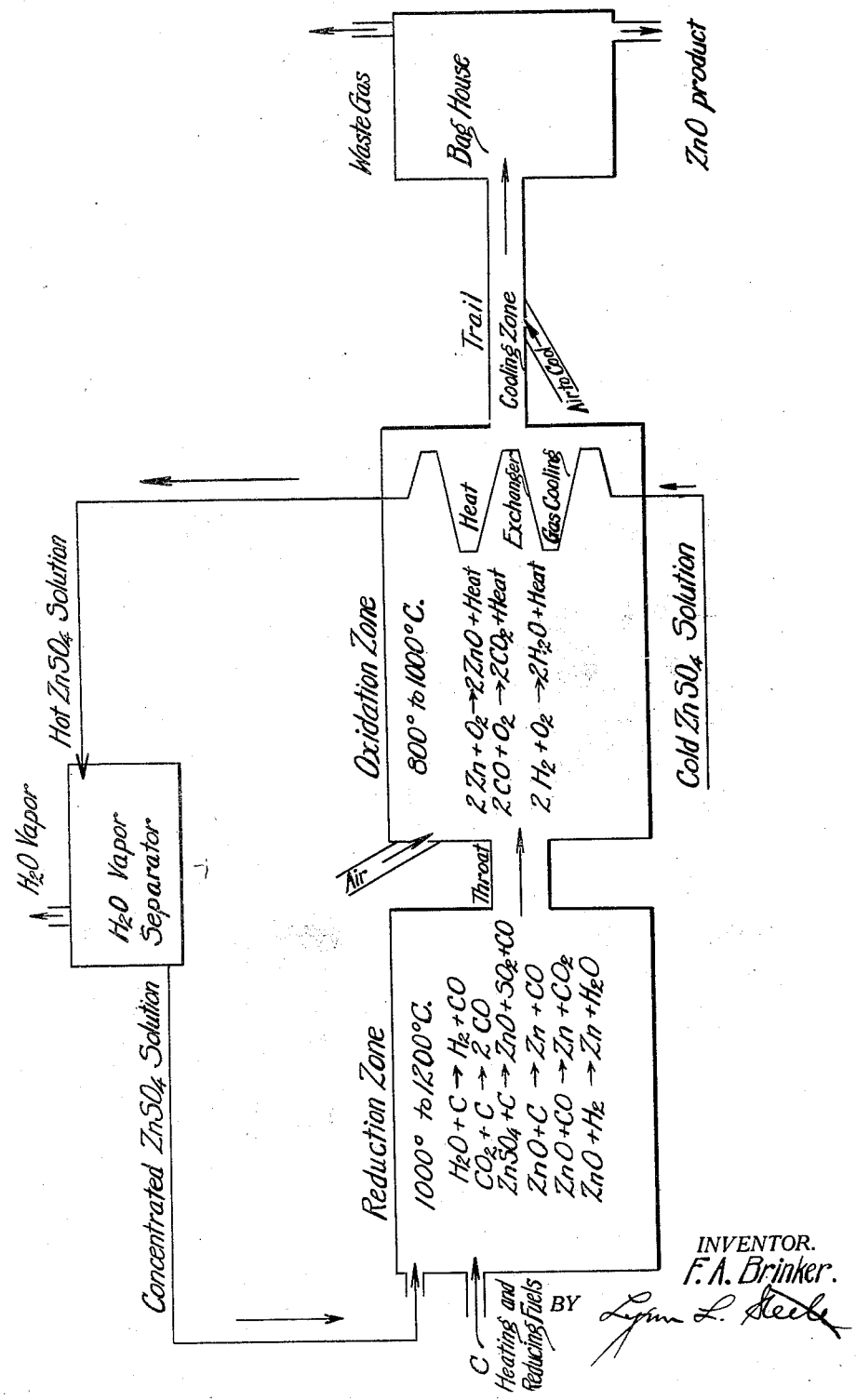
INVENTOR.
F. A. Brinker.
BY Patented Dec. 29, 1931

1,838,359

UNITED STATES PATENT OFFICE

FREDERIC A. BRINKER, OF SAN FRANCISCO, CALIFORNIA

PRODUCING FUMED ZINC OXIDE FROM ZINC SULPHATE SOLUTION

Application filed October 21, 1926. Serial No. 143,127.

The object of this invention is to furnish a process for the production of fumed zinc oxide direct from a water solution of zinc sulphate as the source of the zinc, whereby it shall be possible to utilize a zinc sulphate solution from the leach of a sulphated ore or concentrate to produce a marketable zinc product.

The invention resides primarily in combining the drying or evaporating of the solution in the same step with the reduction of the sulphate, and following this step by an oxidation or combustion step under controlled temperatures whereby an oxide of proper physical form is obtained. The invention also comprises the introduction of air to lower the moisture content of the gases, and the absorption of heat from the oxidation zone for the purpose of cooling the gases and preheating the solution to remove a portion of the moisture and correspondingly concentrate said solution. The invention comprises further all the various features, steps and combinations thereof herein presented which set forth novelty.

In the accompanying drawing, the method of carrying on the process is illustrated diagrammatically in order that at least one scheme of operation may be thoroughly understood.

The type of apparatus indicated, which at the present time is preferred, comprises a chambered furnace in two parts connected by a reduced passage or throat. The first chamber constitutes the drying and reduction zone into which the solution is sprayed and into which the heating and reducing fuels such as oil and powdered coal are introduced. From the reduction zone the resulting zinc vapors and gases pass through the throat into the second chamber which constitutes the oxidation zone and wherein air is introduced in sufficient quantities to oxidize the zinc and to control the temperature. The resulting zinc oxide with the accompanying vapors and gases is then passed through an elongated cooling zone of relatively small cross section called a "trail" into which a large amount of air is injected for cooling purposes and to increase the volume of gases. Thus, when the gases are discharged into the bag house from the trail, the water content thereof is held below the saturation point for the temperature at which the gases pass through the filtering bags. A portion of the cooling required in the oxidation zone may be advantageously accomplished by installing in said zone a heat exchanger through which the cold zinc sulphate leach solution is passed and wherein the latter is heated up to the vaporizing point. This hot solution is then passed to a separator for the elimination of a portion of the water as vapor, and the concentrated solution thus obtained is sprayed into the reduction zone. In this manner, not only is cooling of the oxidation zone assisted, but also there is removed a large volume of water which otherwise would have to be vaporized in the reduction zone and carried through the system.

Having outlined the apparatus and the entire method of operation in a brief manner, the various features thereof will now be considered more in detail under a few principal headings.

*Zinc sulphate solution.*—As above indicated the process has been developed primarily to use the leach from ores and concentrates which have been sulphated by roasting processes or otherwise, whereby the soluble sulphates have been recovered in solution. The solution may be of any strength, but the more concentrated it is the less water will be required to be evaporated. For this reason, the heat exchanger in the oxidation zone has been employed along with the subsequent separation of the water vapor produced. Thus a very high zinc-content solution will be available for the furnace, thereby reducing the amount of heat required in the reduction zone as well as the amount of air introduced into the trail and the total amount of vapors and gases passing through the bag house.

*Reduction zone.*—Here the fuel requirements are two-fold: first, oxidation fuel to furnish the necessary amount of heat; second, reduction fuel to supply the required reducing agents. Oil, coal dust and coke dust may be used, either singly or conjointly, depending upon such conditions as price, locality and the like. Air will be introduced in amounts only sufficient to supply the oxidation fuel and to yield the heat required to maintain the proper reducing conditions.

This zone must be strongly reducing and carry a high enough temperature for the reducing reactions to take place, such a temperature approximating 1000° C. to 1200° C. At these temperatures very little carbon dioxide or sulphur trioxide is formed in view of the presence of free carbon and carbon monoxide. Part of the water will be reduced to hydrogen and carbon monoxide will be formed, both these being strong reducing agents. The chief reactions will be:

$$H_2O + C = H_2 + CO$$
$$CO_2 + C = 2CO$$
$$ZnSO_4 + C = ZnO + SO_2 + CO$$
$$ZnSO_4 + CO = ZnO + SO_2 + CO_2$$
$$ZnO + C = Zn(vapor) + CO$$
$$ZnO + CO = Zn(vapor) + CO_2$$
$$ZnO + H_2 = Zn(vapor) + H_2O$$

Any tendency for reversal of the reaction $ZnO + H_2 = Zn + H_2O$ will be overcome by the presence of such strong reducing agents as C and CO. Even if a very small reversal should occur, the reversal product in the end product would produce no detrimental effect.

*Oxidation zone.*—The products of the reduction zone coming through the throat into the oxidation zone will be zinc vapor, carbon monoxide, sulphur dioxide, hydrogen and water vapor. With the addition of air, the zinc, hydrogen and carbon monoxide oxidize. This is an exothermic reaction and takes place around 800° C. to 1000° C. although an enormous amount of cold air is introduced. However the gases and vapors cool down very fast as they approach the end of the zone, this drop being carefully controlled through the medium of the heat exchange and the air introduction, as the cooling here has much to do with the physical form of the oxide which is an important feature for the paint and rubber trades. Thus, there is a double advantage here in preheating the solution to drive off some of its water and thereby assist in cooling the oxidized vapors and gases.

*Trail and bag house.*—The trail is quite long in order to give the gases, vapors and fume time to cool before entering the bags, and if necessary more air is introduced here to assist in cooling and also to bring the water content of the gases down below the saturation point for the temperature at which the vapors and fume are passed through the bags in which the zinc oxide is collected.

I claim:

1. A process for producing zinc oxide from a solution of a zinc salt comprising spraying the solution into a reducing atmosphere wherein the solvent is evaporated and the salt is reduced to zinc vapor, and passing the vapor into an oxidizing atmosphere for the formation of the oxide.

2. A process for producing zinc oxide from a water solution of zinc sulphate comprising injecting the solution into a reducing atmosphere maintained at a temperature to evaporate the water and form water gas and favorable to the reduction of the zinc sulphate to zinc vapor, and passing the vapor into an oxidizing atmosphere.

3. A process for producing fumed zinc oxide from a solution of zinc sulphate comprising injecting the solution into a reducing atmosphere wherein the solvent is evaporated and the sulphate is reduced to zinc vapor, passing the vapor into an oxidizing atmosphere, supplying oxygen containing medium thereto, lowering the temperature, and controlling the temperature drop to govern the physical form of the resulting oxide.

4. A process for producing zinc oxide from zinc sulphate solution comprising injecting the solution into a reducing atmosphere wherein the solvent is evaporated and the sulphate is reduced to zinc vapor, and passing the vapor into an oxidizing atmosphere wherein zinc oxide forms.

5. A process for producing zinc oxide from zinc sulphate water-solution comprising injecting the solution into a reducing atmosphere containing reducing carbon wherein the water is evaporated and formed into hydrogen and carbon oxide and the zinc sulphate is reduced to zinc vapor, and oxidizing the zinc vapor to yield zinc oxide.

6. A process for producing zinc oxide from zinc sulphate solution comprising introducing the solution into a reducing atmosphere for the evaporation of the solvent and reduction of the zinc sulphate to zinc vapor, passing the vapor into an oxidizing atmosphere to produce zinc oxide, and cooling the oxidized vapors by preheating a portion of zinc sulphate solution therein to expel water from said solution.

7. A process for producing zinc oxide from zinc sulphate solution comprising simultaneously drying the solution and desulphatizing the sulphate, treating the product thus obtained under vaporizing and oxidizing conditions to convert it into zinc oxide fume, and cooling the oxidized vapors by preheating a portion of zinc sulphate solution therein to expel water from the solution.

8. In a process for treating zinc sulphate solution, the step of drying the solution, desulphatizing the sulphate and reducing the zinc all in a single step, by establishing a heated reducing atmosphere and introducing the solution into said heated reducing atmosphere wherein the solvent is evaporated and zinc vapor is formed.

In testimony whereof I affix my signature.

FREDERIC A. BRINKER.